United States Patent
Hale, Jr. et al.

(10) Patent No.: US 6,450,583 B2
(45) Date of Patent: Sep. 17, 2002

(54) METHOD OF MANUFACTURING COLD FORMED LIGHT ALLOY AUTOMOTIVE WHEEL RIM

(75) Inventors: Arthur D. Hale, Jr., Long Beach; Michael J. Beyer, Lake Forest, both of CA (US)

(73) Assignee: Specialty Blanks, Inc., Terre Haute, IN (US)

( * ) Notice: Subject to any disclaimer, the term of this patent is extended or adjusted under 35 U.S.C. 154(b) by 0 days.

(21) Appl. No.: 09/827,659

(22) Filed: Apr. 6, 2001

Related U.S. Application Data

(62) Division of application No. 09/183,571, filed on Oct. 30, 1998, now Pat. No. 6,244,668.

(51) Int. Cl.[7] .................................................. B60B 3/10
(52) U.S. Cl. ............................ 301/63.101; 301/63.101; 29/894.353; 29/894.354
(58) Field of Search .............................. 301/67, 95, 96, 301/97, 98, 63.1; 29/894.322, 894.35, 894.351, 894.353, 894.354

(56) References Cited

U.S. PATENT DOCUMENTS

| | | |
|---|---|---|
| D29,991 S | 1/1899 | Welch |
| 1,718,874 A | 6/1929 | Paull |
| 1,809,605 A | 6/1931 | Sauzedde |
| 2,028,536 A | 1/1936 | Eksergian |
| 2,029,132 A | 1/1936 | Skelton |
| 2,057,565 A | 10/1936 | Eksergian |
| 2,083,327 A | 6/1937 | Eksergian |
| 2,126,223 A | 8/1938 | Schwinn |
| 2,143,950 A | 1/1939 | Kliesrath |
| 2,155,667 A | 4/1939 | Jeune |
| 3,228,097 A | 1/1966 | Tucker |
| D216,785 S | 3/1970 | Hata |
| 3,784,260 A | 1/1974 | Araya |
| 4,054,168 A | 10/1977 | Beers et al. |
| 4,127,020 A | * 11/1978 | Bosch ..................... 29/159.1 |
| 4,185,370 A | * 1/1980 | Evans ..................... 29/159.1 |
| 4,286,825 A | 9/1981 | Sieving |
| 4,462,447 A | 7/1984 | Siefert et al. |
| 4,624,038 A | 11/1986 | Walther |
| 5,292,182 A | 3/1994 | Kanazawa et al. |
| 5,380,071 A | 1/1995 | Kier, Jr. |
| 5,433,511 A | 7/1995 | Wei |
| 5,446,962 A | 9/1995 | Matossian et al. |
| 5,526,977 A | 6/1996 | Wei |
| 5,533,260 A | 7/1996 | Kier, Jr. |
| 5,533,261 A | 7/1996 | Kemmerer |
| D389,446 S | 1/1998 | Bradley |
| 5,845,400 A | 12/1998 | Takamoku |
| 5,927,167 A | * 7/1999 | Naumann et al. ........... 29/27 C |

* cited by examiner

*Primary Examiner*—S. Joseph Morano
*Assistant Examiner*—Long Bao Nguyen

(57) ABSTRACT

A spun light alloy rim that substantially duplicates the strength and light weight of a cold forged alloy rim and incorporates through its method of manufacture appearance features and the relatively low cost of a cast alloy wheel.

14 Claims, 5 Drawing Sheets

METHOD OF MANUFACTURING COLD FORMED LIGHT ALLOY AUTOMOTIVE WHEEL RIM

CROSS-REFERENCE TO RELATED APPLICATION

This application is a divisional of U.S. patent application Ser. No. 09/183,571 filed Oct. 30, 1998, now U.S. Pat. No. 6,244,688, entitled "Cold Formed Light Alloy Automotive Wheel Rim".

BACKGROUND OF THE INVENTION

1. Field of the Invention

The present invention relates to the field of automobile wheels and, more particularly, to an improved automobile wheel rim and method of making same.

2. Description of the Prior Art

Automobile owners often desire to improve the appearance and performance of their cars by replacing the original equipment wheels supplied by the vehicle manufacturer (OEM) with aftermarket wheels of lighter weight and more stylish appearance. While many owners are satisfied with aftermarket wheels that are comparatively more stylish than OEM wheels, some owners, "automotive enthusiasts" (drivers of sports and high performance type cars), desire wheels that are of substantially lighter weight and therefore improve the performance as well as the appearance of their vehicles.

Automobile wheels of a type which provide a decorative appearance and relatively light weight are most commonly manufactured by using a light weight casting alloy, typically A356 or A357 aluminum, to cast a wheel in the desired configuration. Typically, these wheels are cast as one-piece units with integral wheel-centers and rims. After casting, the wheels are finish machined to final dimensions. There are many examples of wheels of this type, one of which is U.S. Pat. No. 5,292,182, entitled "Light Alloy Cast Wheel" issued to Kanazawa et al., Mar. 8, 1994. Some cast alloy wheels possess an ornamental design feature that provides for a smooth, stepless, radially outwardly curving, relatively thick appearing outboard flange. This appearance feature has proved to be popular in the aftermarket. An example of a wheel of this type is U.S. Pat. No. Des. 389,446, entitled "Rim for a Vehicle Wheel" issued to Bradley, Jan. 20, 1998.

That is, cast alloy wheels, although economical to manufacture and appropriately decorative, possess certain drawbacks that render them undesirable to "automotive enthusiasts" who desire wheels of lighter weight and greater strength. The major drawback of a cast alloy wheel is excess weight. The most common alloys (A356 and A357) used in the production of these wheels possess relatively low yield and ultimate tensile strengths. The casting process produces a metal structure that is porous and brittle in nature, therefore resulting in a lower fatigue life in comparison to cold rolled alloy sheet of equivalent thickness. To account for these deficiencies, manufacturers of cast alloy wheels must use a relatively large mass of material and thereby produce a wheel that is heavier than that produced by other methods. Quality control is also a problem in the manufacture of cast wheels as differential cooling between relatively thick and comparatively thinner sections of an integral one-piece wheel often results in the formation of voids and blowholes in the finished product.

Another method of producing automotive wheels is cold forging. Due to their high cost, cold forged wheels are rarely seen on passenger cars but, rather, are used on high performance racing vehicles almost exclusively. Cold forged wheels are manufactured from cold rolled aluminum alloy tube, bar, or plate stock. Cold rolled aluminum alloy has a dense grain structure, giving the metal excellent ductility and a high fatigue strength. Alloys commonly used in forging such as 7075 and 7050 series aluminum have significantly higher yield and tensile strength than the A356 and A357 casting alloys. A cold forged wheel may be manufactured as a one- or two-piece unit. The process begins by hammer forging the initial stock (bar, tube, or plate) into a donut shape. The rim portion is coaxially extruded from the forged blank. In the case of a one-piece unit, after extrusion of the rim, the hub is forged radially inwardly to its desired configuration. Critical surfaces are then finish machined. An example of a cold forged wheel is described in U.S. Pat. No. 5,446,962, entitled "Process of Manufacturing One Piece Forged Wheels" issued to Matossian et al., Sep. 5, 1995. Cold forged wheels have the characteristics of light weight and high strength that are greatly prized among "automotive enthusiasts". However, due to the high cost of producing these wheels, few enthusiasts can aspire to owning a set. Thus, there remains a need for a lightweight, high strength wheel having, as an ornamental design feature, an outboard flange that flares radially outwardly in an attractive manner and exhibits an appearance of having axial depth, that can be produced at a cost comparable to that of a cast wheel.

SUMMARY OF THE INVENTION

The present invention provides an improved cold formed (spun) alloy wheel rim which possesses the light weight and high strength characteristics which are prized by "automotive enthusiasts" and are typically associated with forged wheels, at a cost comparatively less than that of a forged wheel. A further advantage of the invention is that it incorporates in a spun alloy rim a smooth, stepless, radially outwardly curving exterior flange which provides for a clean exterior rim appearance often associated with cast wheels. This clean, stepless, radially outwardly curving exterior flange is an ornamental design feature desired by "automotive enthusiasts" that formerly was only available in cast alloy wheels.

The improved wheel rim of the present invention achieves its advantages through a novel combination of cold rolling and spinning manufacturing techniques. By means of this process, the improved rim's exterior flange is rolled radially outwardly and turned back axially inwardly and then rolled radially inwardly to form an annular bearing surface defining the outboard wall of the bead seat, thereby providing for the smooth, stepless, radially outwardly curving exterior desired by enthusiasts. Further, the drop well of the improved rim is located entirely inboard of the rim's centroidal axis, a feature that allows the wheel-center to be mounted at or near the wheel centroid, minimizing bending moments that occur when the wheel-center is offset from the wheel centroid. Thus, a lighter, stronger wheel can be fabricated, thereby making the wheel more attractive to "automotive enthusiasts".

Other features and advantages of the invention will become apparent from the following detailed description, taken in conjunction with the accompanying drawings, which illustrate by way of example, the features of the invention.

DETAILED DESCRIPTION OF THE PREFERRED EMBODIMENTS

Figure 1:
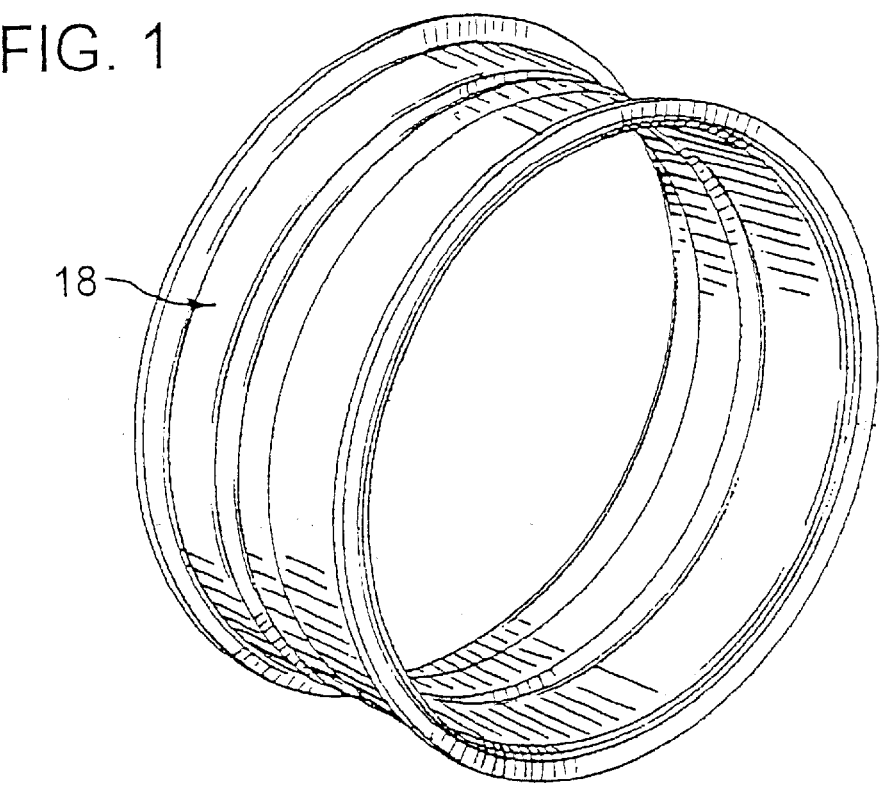
FIG. 1 is a front perspective view of a wheel rim embodying the present invention.
Figure 2:
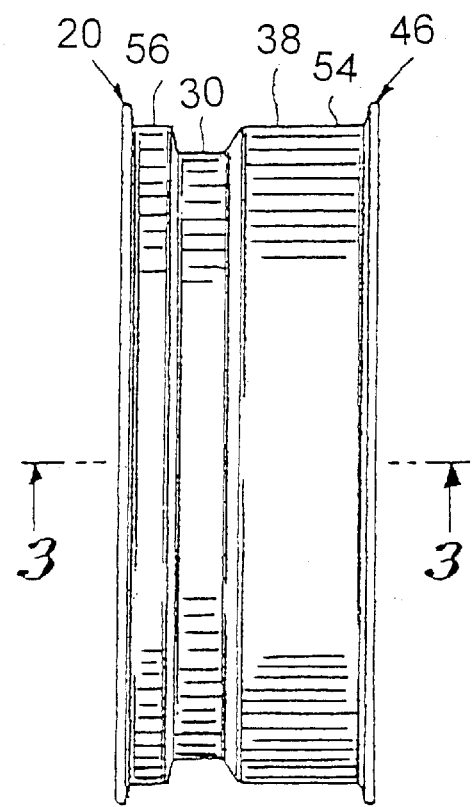
FIG. 2 is a left side view of the rim shown in FIG. 1.
Figure 3:
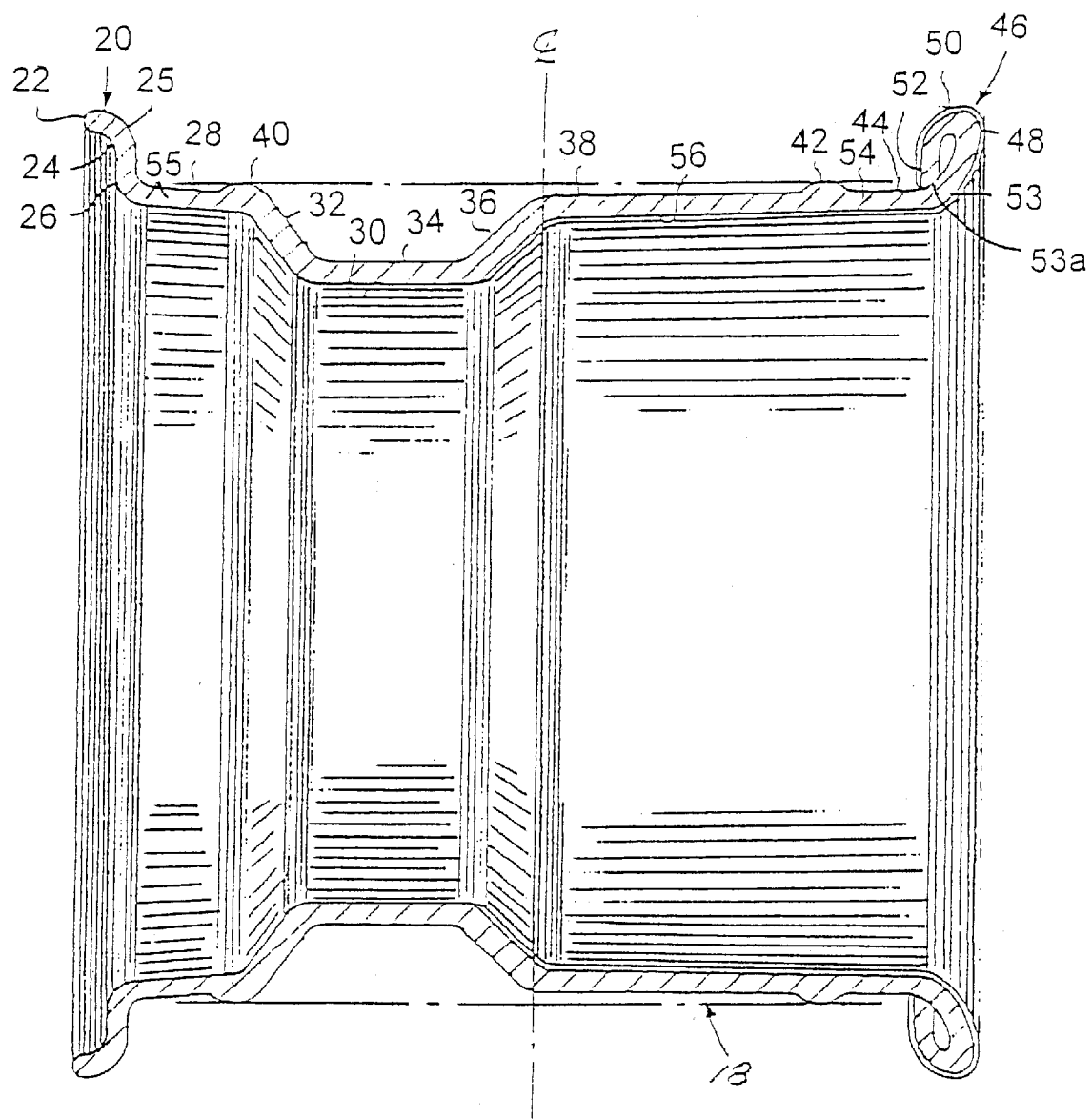
FIG. 3 is a sectional view, enlarged in scale, of the rim taken along the line 1—1 as shown in FIG. 2.

As shown in FIGS. 1–3 for purposes of illustration only, the improved spun alloy rim of the present invention comprises an annular rim body, generally designated as 18, which possesses an axis of symmetry and is cold formed from light alloy metal sheet material such as aluminum, substantially 6 mm thick. The rim body includes a radially inwardly depressed, annular drop well, generally designated 30. Formed on the inboard side of the drop well is an inboard bead seat 55 having a radially outwardly flared inboard flange 20 formed on the inboard side thereof. Formed on the outboard side of the drop well 30 is a cylindrical wheel-center barrel 38 configured at its outboard extent with an inboard second bead seat, generally designated 54. Importantly, such outboard seat is configured with an outboard flange, generally designated 46, constructed of the parent material and is cold formed to flare radially outwardly defining a funnel shaped radially outwardly curved flange face 48, also referred to herein as a radially outwardly curved flare 48, and is then turned axially inwardly and then back on itself to project radially inwardly to define an axially inwardly facing bearing ring 52.

In practice, the rim is constructed from a metal plate blank rolled into a cylinder with the ends butt welded together. The blank may be constructed from any one of a number of aluminum, steel or other alloys. The rim is cold formed from the single cylindrical blank to define the desired end configuration and form the outboard flange 46 to provide the aesthetically appealing, radially outwardly rolled flange face 48 which, when combined with the back turned configuration, affords an appearance of axial depth typically associated with cast wheels.

The blank is formed with the annularly indented drop well reduced in diameter so as to facilitate mounting of a conventional tire from the axial outer extremity of the rim itself.

The first bead seat 55 is constructed with an inboard annular shoulder 40 and spaced axially from the inboard flange 20 to form therebetween an annular beat seat 28. Such inboard flange is turned radially outwardly to form an annular flange ring 25 having a radially inwardly facing ring 22 spaced from the shoulder 40 to cooperate in forming the inboard bead seat. The inboard flange 20 further includes an inward facing flange face 24 having a curved portion 26.

The drop well is offset axially inboard from the centroid of the rim and is formed with a reduced-in-diameter clearance wall 34 and oppositely disposed radially and axially outwardly angled side walls 32 and 36 joining respectively with the inboard seat and barrel 38.

Spacing of the drop well inboard of the rim's centroid serves to provide the wheel-center barrel 38 with a relatively long axial dimension so the wheel center can be spaced several cm, substantially 7 cm in the present embodiment, axially inwardly from the outboard flange face 48 to present an attractive deep appearance. This feature also enables the wheel-center to be placed at the rim's centroidal axis thereby minimizing the bending moments that would otherwise be produced with the wheel-center offset axially outwardly from the rim centroid. In the present embodiment, the drop well is located entirely inboard of the rim body's geometric center to create the deepest wheel-center barrel possible. However, other embodiments may include a drop well that is only partially offset from the rim body's geometric center.

Figure 4:
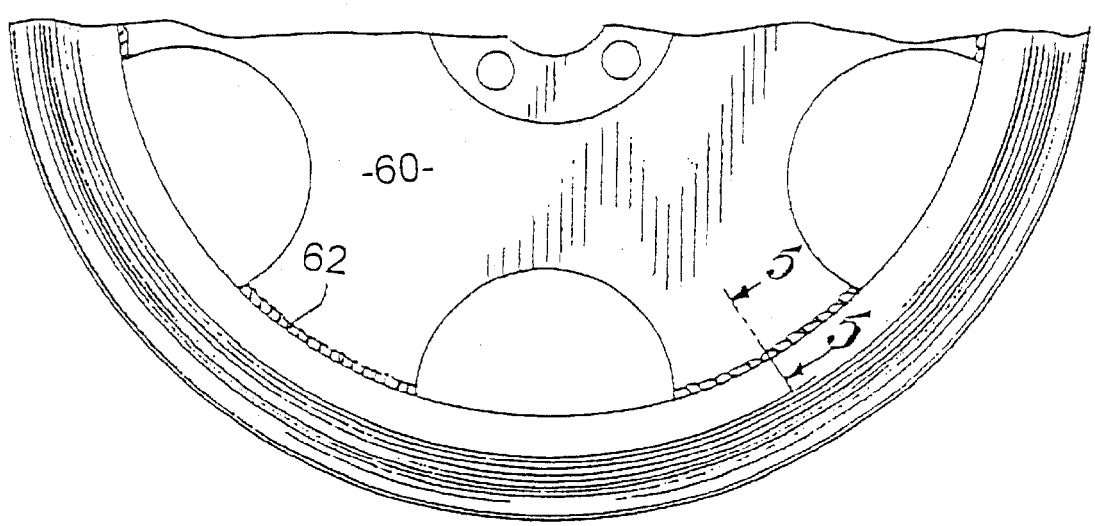
FIG. 4 is a cutaway front side view, enlarged in scale, of a wheel incorporating the rim shown in FIG. 1 which includes a wheel-center.

The cylindrical wheel-center barrel 38 projects from drop well side wall 36, axially outboard along an axis parallel to the axes of the rim to connect with bead seat shoulder 42 and flange 46. The drop well 30 is formed interiorly with a cylindrical cavity 56 to accept a disk shaped wheel-center 60 (FIG. 4) to be welded or otherwise secured thereto at 62.

The outboard bead seat 54 is formed by, in addition to the bead seat shoulder 42, the annular seat surface 44, outwardly curved flare forming the curved flange face 48, axially inwardly projecting turn back 50 which turns radially inwardly to form the bearing ring 52 having a bearing surface facing axially inboard to be spaced axially from such bead seat shoulder 42 to secure the outboard tire bead (not shown).

The radially outwardly curving flange face or flare 48 is about 6 mm thick and possesses an axially outwardly facing surface having a radius of curvature of substantially 8 mm. A bearing ring 52 is turned radially inwardly to cause the radially inner edge 53 to contact the radially outwardly facing bead seat surface to afford a bracing structure providing structural support for such outboard flange. In the preferred embodiment, the edge 53 is tapered radially and axially inwardly to complement the shape of an axially inward facing wall 53a of the flange face or flare 48 at its root. As will be appreciated by those skilled in the art, this arrangement provides for the appearance of a clean, stepless, radially outwardly curving outboard flange and serves to duplicate in a cold formed rim a design feature previously found only in cast alloy wheels.

The rim body 18 is manufactured by a process known as cold working. Cold working is a manufacturing process whereby metal blanks, such as rim blank 70 (FIG. 6), are forced to assume a new shape through plastic flow. In cold working metal, the grain of the metal is compressed, resulting in an effect known as strain hardening. Strain hardening increases the strength of parts in the direction in which plastic flow has occurred with a concurrent loss in ductility. Cold working introduces biaxial strength characteristics into a part. Essentially, cold worked metal is stronger in the direction it has been forced to plastically flow an, depending on the degree of plastic flow, may suffer a loss of strength in the transverse direction. Cold working is readily distinguishable from hot working in that cold working takes place at room temperature. Hot working takes place at a temperature above the metal's plastic temperature which is that temperature in which metal can be plastically formed without the occurrence of strain hardening.

The improved rim of the present invention is produced from a 5000 series aluminum alloy at sub-plastic temperatures. Alloys of this type are formed in the T0 (soft condition) and gain their high strength purely through the strain hardening created by cold working the metal. It is to be stressed, however, that the novel manufacturing process is not limited to strain hardening aluminum alloys but is equally applicable to heat treatable aluminum alloys as well as magnesium or steel and other ferrous or non-ferrous metal alloys which can be procured in plate, bar, sheet, or tube form.

Manufacture of the rim involves two discrete types of cold working processes: cold rolling and spinning. In a cold rolling process, ductile metal of bar, plate or sheet stock is formed by passing the stock between a pair of rollers at low speed. Cold rolling is typically used to strain harden plate and sheet stock by reducing its thickness. Also. the rollers may be in the form of mandrels which form features into the stock. Spinning is a cold working process similar to cold rolling. Spinning differs from cold rolling in that a metal blank of circular configuration is mounted in a rotary machine and spun at relatively low speeds about its axis. The blank may be of formed plate or sheet stock or of cut tube stock. The blank is forced to deform plastically by engaging the blank with a pair of radially inner and outer mandrels. Features are formed in the blank by moving the mandrels radially inward or outward according to a predetermined pattern. Multiple passes are usually required to create a finished product. The pattern for each pass is typically programmed into a special purpose computer which controls the sequence of forming operations.

A method for making the improved automotive wheel rim of the present invention by a combination of cold rolling and spinning manufacturing techniques includes selecting a metal sheet of aluminum about 6 mm thick and cutting it to predetermined dimensions for facing.

Figure 6:
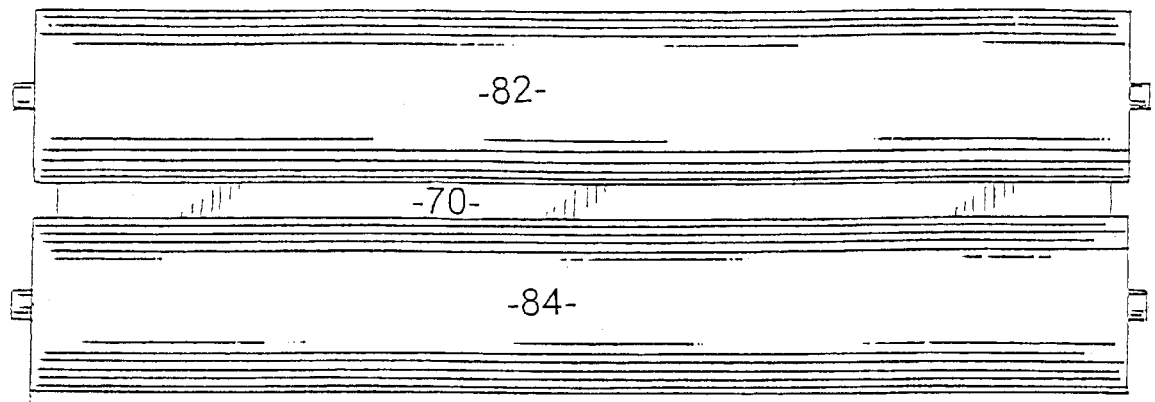
FIG. 6 is a left sectional view, enlarged in scale, taken along a plane passing through the radial axis of a cylindrical unitary rim blank utilized in a method for making the rim shown in FIG. 1.

The sheet is cold rolled into a circular configuration by rollers 82 and 84 to form a cylindrical blank with the ends of such rolled sheet abutted together. Such ends are then butt welded, thus forming a unitary cylindrical rim blank 70 as shown in FIG. 6, one side of which is shown in axial cross section.

Figure 7:
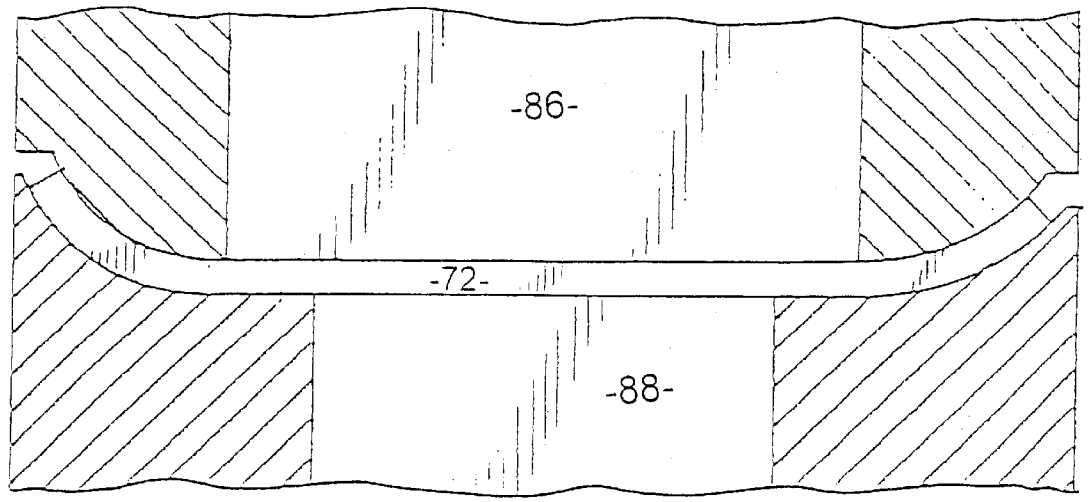
FIG. 7 is a sectional view similar to FIG. 6, showing the inboard and outboard extent of the blank being flared radially outwardly.

The cylindrical rim blank 70 is clamped in a hydraulic press equipped with respective radially outer and radially inner dies 86 and 88 of predetermined radii of curvature. These dies are pressed radially together to cold form flares in the axial opposite ends of the rim blank respective initial radially outwardly turned outboard and inboard flare beads 72 and 77 (FIG. 7).

Figure 8:
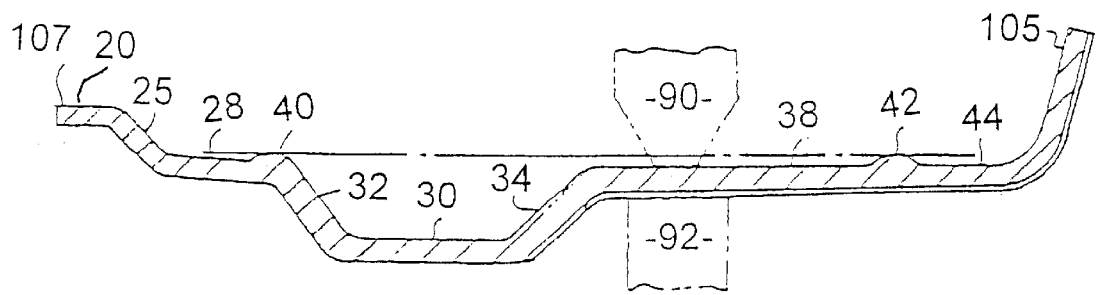
FIG. 8 is a sectional view similar to FIG. 6 showing formation of the drop well and further radial outwardly flaring of the inboard and outboard flanges.

The initially flared rim blank is removed from the press and clamped in a four-axis-spinning machine to be spun about its axis. A pair of inner and outer radially opposed mandrels 90 and 92 (FIG. 8) are pressed against the rotating blank and are guided across the width of the blank by a special purpose computer program to form the radially inwardly recessed drop well 30, the respective inboard and outboard bead seat shoulders 40 and 42, the inboard and outboard bead seats 28 and 44, the wheel-center barrel 38, and to further cold form the annular surfaces of the axially outer and inner extent of such blank to form an intermediate annular outboard flange disk 105 projecting radially outwardly and an intermediate inboard flange configuration 107 having a dog-leg shaped cross section.

Figure 9:
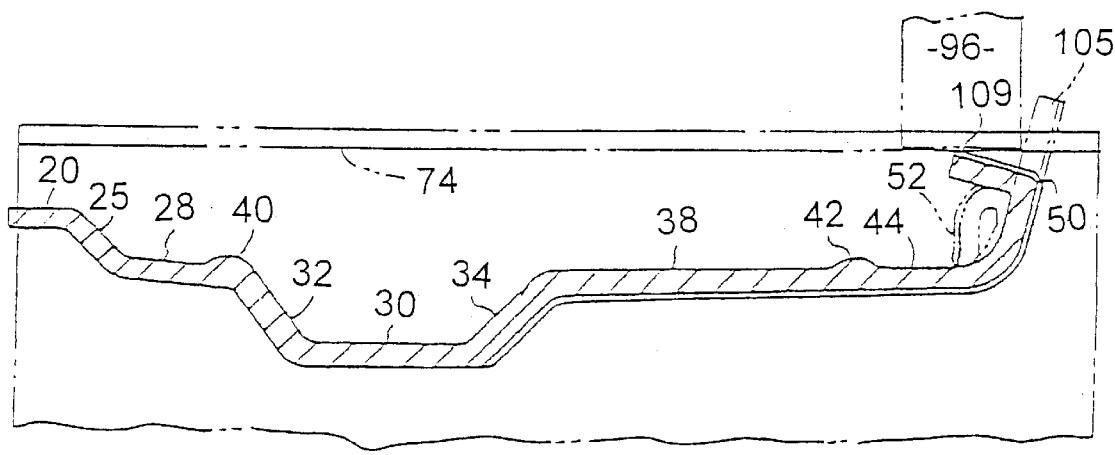
FIG. 9 is a sectional view similar to FIG. 6 showing the outboard extent of the flange being bent back on itself.

Referring to FIG. 9, a cylinder die 80 is telescoped over the cylindrical blank with the radially outer surface of the dog leg flange element 107 acting as a guide surface until contacting radially outward flare element 105, such die being advanced in the outboard direction. A radial mandrel 96 is then advanced as the blank is spun to cold form the distal extremity of the flange element 105 over from the broken line radial position to the solid line axially inwardly projecting position 109. Cylinder die 80 is then removed axially inwardly off the rim blank and radial mandrel 96 advanced further to contact the distal edge of flare element 109 and press it radially inwardly, causing the distal extent thereof to roll further inwardly, thus forming in the intermediate portion of the flange blank the turn back 50 and in the distal portion thereof the bearing ring 52. It will be appreciated that such distal extent is rolled radially inwardly until the distal edge contacts the radially outwardly facing bead seat surface 44 to form the annular bearing ring 52 shown in broken line. By this novel procedure a clean, stepless, upwardly curving exterior flange, a design feature appreciated by "automotive enthusiasts" and formerly only available on cast rims, is duplicated on a spun rim.

Figure 10:
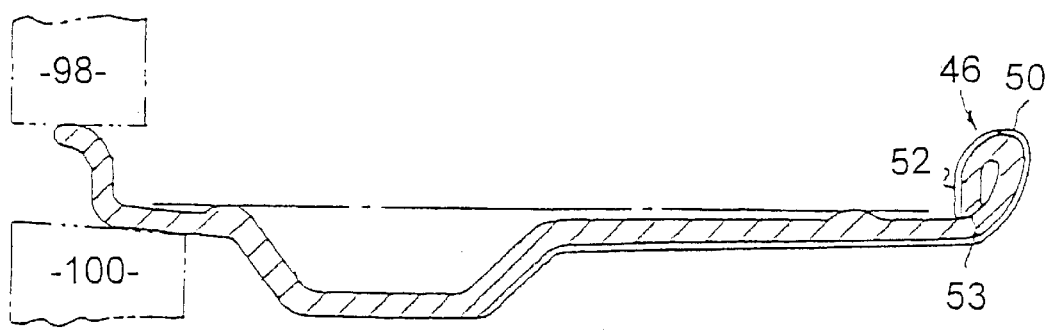
FIG. 10 is a sectional view similar to FIG. 6 showing the inboard flange bent fully back on itself and the outboard flange in its final configuration.

The formed rim blank is then removed from the four-axis-spinning machine and clamped into a single axis spinning machine where mandrels 98 and 100 form elements 76 and 78 into the finished configuration of the inboard flange as shown in FIG. 10. The overall rim width is controlled by trimming the inboard flange as a final operation.

The now fully formed rim is inspected by checking the height of the bead seat shoulders 40 and 42 and the width of the bead seat flanges with go/no-go type gauges.

The now fully formed and inspected rim is completed by finish machining and polishing the exterior surfaces to achieve the desired aesthetic effects of a clean outward surface.

Figure 5:
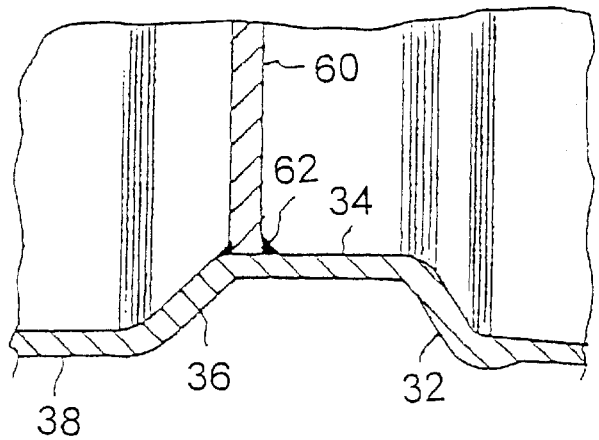
FIG. 5 is a cross-sectional view, enlarged in scale, of the rim to wheel-center joint, taken along line 2—2 as shown in FIG. 4.

In use, the rim is attached to a wheel center 60 (FIGS. 4 and 5), which can be of various ornamental designs. This is accomplished by heating the rim and then press fitting the wheel center to the rim. Upon cooling, a ten to fifteen thousandths of an inch press fit is achieved. The wheel center is then seam welded 62 to the rim.

In operation, it will be appreciated that the rim of the present invention may be mounted on a vehicle via the lug bores in the wheel center (FIG. 4) and the load of the vehicle will be transmitted through such center to the outboard side of the drop well 30 and downwardly through the tire having its bead seats mounted on the respective bead seat surfaces 28 and 44. It will be appreciated by those skilled in the art that the outboard bead sets on the bead seat surface 44 centered between the outboard bead seat shoulder 42 and bearing surface 52, i.e., bearing ring. As loads are encountered and shock transmitted to the wheel, the outboard bead will be held firmly in position on the bead seat surface 44 and supported against axial shifting. The outboard flange 46 will serve to support such beads from axially outwardly shifting by means of the inwardly facing bearing surface 52, i.e., bearing ring. Axially outwardly acting loads applied to such bearing ring 52 will be resisted by the configuration of the cold formed flange 46 itself. That is, any such axially outwardly acting forces applied to such bearing ring will tend to force such ring axially outwardly but such axial outward movement will be resisted by the fact that the medially inward edge 53 is in intimate contact with the axially inwardly facing wall of the flange face or flare 48 such that outwardly shifting thereof is resisted. Consequently, the cold formed rim of the present invention serves to not only provide an aesthetically pleasing appearance and extremely advantageous load carry capability but also provides an outboard flange configuration which provides effective support against loads applied thereto by the tire bead.

It will be appreciated that a new and improved form of cold rolled rim has been provided. While only the present preferred embodiment has been described in detail, as will be apparent to those skilled in the art, certain changes and modifications can be made without departing from the scope of the invention as described in the following claims.

What is claimed is:

1. A method of manufacturing an automotive wheel rim comprising the steps of:
    rolling metal sheet stock of predetermined dimensions into a rim blank of circular configuration;
    butt welding the free ends of said rim blank to form a unitary rim blank;
    forming radially outwardly curving flares on the inboard and outboard edges of said unitary rim blank;
    mounting said rim blank in a rotary machine tool to form a drop well, inboard and outboard bead seat flanges and bead seat shoulders on said rim blank;
    forming said outboard flare radially outward and forming said inboard flare into a flange possessing an annular guiding surface;
    introducing a cylindrical profile die over said annular guiding surface until said die contacts said outboard flare and in conjunction with said rotary machine tool to roll said outboard flare axially inward;
    rolling said outboard flare radially inward;
    trimming the inboard flange; and
    finish machining and polishing the exterior surfaces of said rim blank to form a completed rim body.

2. The method recited in claim 1 wherein said circular rim blank is formed by cold rolling.

3. The method recited in claim 1 wherein said unitary rim blank is formed by cutting tube stock to a predetermined width.

4. The method recited in claim 1 wherein said outwardly curving flares are formed by means of a hydraulic press equipped with forming dies.

5. The method recited in claim 1 wherein said cylindrical profile die consists of a thin wall cylinder of predetermined dimensions.

6. The method recited in claim 2 wherein said means for forming and trimming the inboard flange is a single-axis spinning machine.

7. A method of making an automotive wheel rim to simulate a predetermined cast wheel cross section outboard flange having a radially and axially outwardly curved flange face, comprising the steps of:
    selecting a cylindrical rim blank having inboard and outboard axial ends;
    mounting said rim blank in a rotary machine tool to form a drop well, inboard and outboard bead seat flanges and bead seat shoulders in said rim blank;
    forming an annular outboard bead shoulder on said rim blank spaced from said outboard axial end to leave an outboard flange blank outboard thereof on said rim blank;
    cold forming said flange blank to form an outboard flare projecting radially outwardly to form a radially and axially outwardly curved surface defining said flange face and possessing an annular guiding surface;
    introducing a cylindrical profile die over said annular guiding surface until said die contacts said outboard flare and in conjunction with said rotary machine tool performing the step of rolling said outboard flare axially inward;
    further cold forming said flange blank to turn an intermediate portion thereof distal of said flare radially inwardly to form a turn-bank; and
    further forming said flange blank to turn the free extremity thereof radially inwardly to form an inboard facing annular bearing surface spaced axially from said shoulder to cooperate therewith in forming a bead seat, said forming of said flare, turn back and bearing ring being operative to form said outboard flange to simulate said predetermined cast wheel.

8. The method of claim 7 wherein said blank is selected to be of aluminum alloy.

9. The method of claim 7 wherein said flange blank is formed to project said bearing ring radially inwardly to contact the radially exterior surface of said rim blank.

10. The method of claim 7 wherein said flange blank is formed to curve said flare outwardly to form said flange face with a radius of curvature of substantially 8 mm.

11. The method of claim 7 wherein said flange blank is formed by spin forming.

12. The method recited in claim 1, wherein the step of rolling said outboard flare radially inward is performed by said rotary machine tool.

13. The method recited in claim 1 further comprising the step of clamping said rim blank in a means for forming and trimming the inboard flange.

14. A method of manufacturing an automotive wheel rim comprising the steps of:
    rolling metal sheet stock of predetermined dimensions into a rim blank of circular configuration;
    butt welding the free ends of said rim blank to form a unitary rim blank;
    forming radially outwardly curving flares on the inboard and outboard edges of said unitary rim blank;
    mounting said rim blank in a rotary machine tool to form a drop well, inboard and outboard bead seat flanges and bead seat shoulders on said rim blank wherein said rotary machine tool is a four-axis-spinning machine equipped with single mandrels and with pairs of radially opposed mandrels;
    forming said outboard flare radially outward and forming said inboard flare into a flange;
    rolling said outboard flare axially inward;
    rolling said outboard flare radially inward;
    trimming the inboard flange; and
    finish machining and polishing the exterior surfaces of said rim blank to form a completed rim body.

* * * * *